UNITED STATES PATENT OFFICE.

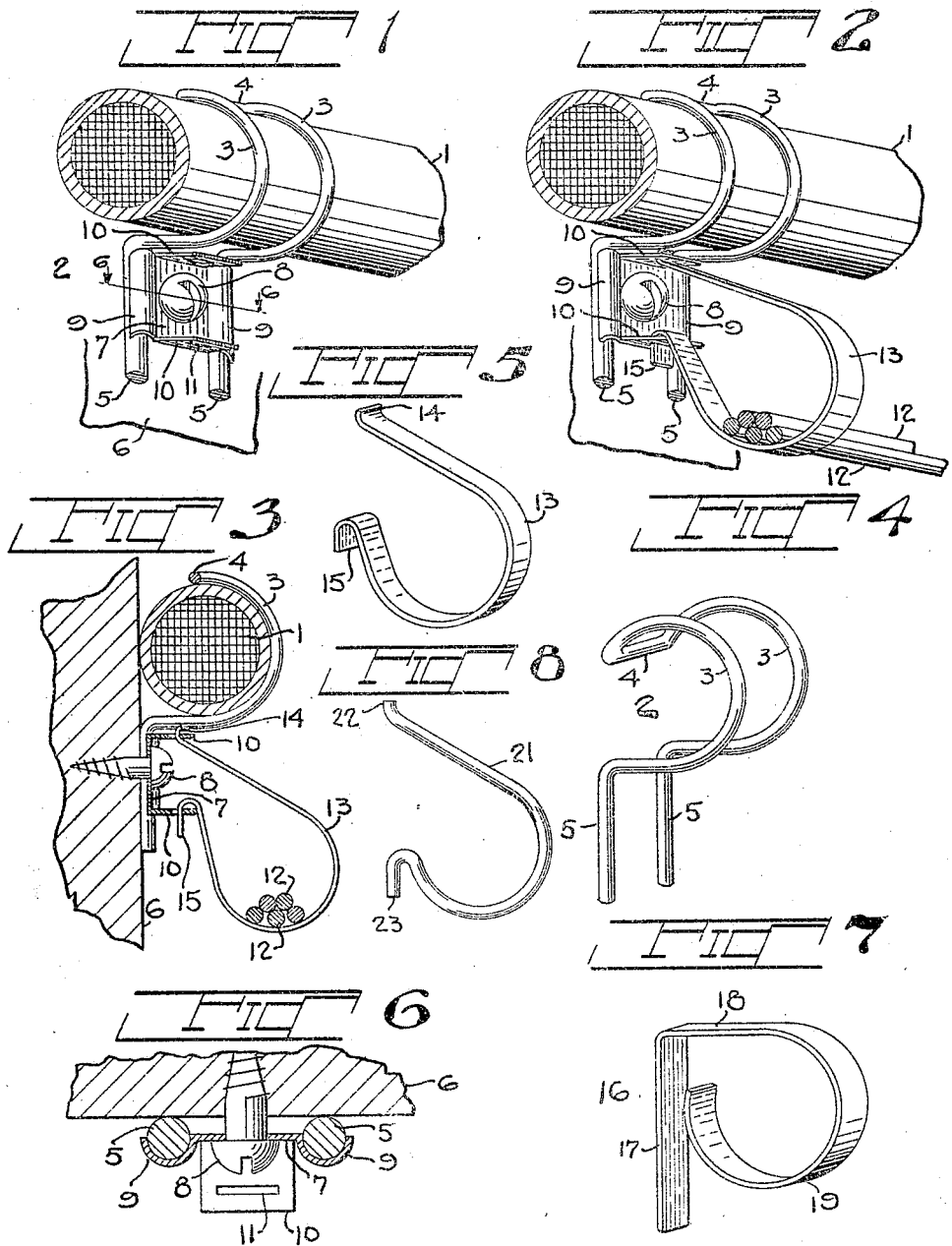

HENRY W. PLEISTER, OF WESTFIELD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,381,231.     Specification of Letters Patent.     Patented June 14, 1921.

Application filed August 17, 1920. Serial No. 404,171.

*To all whom it may concern:*

Be it known that I, HENRY W. PLEISTER, a citizen of the United States, residing at Westfield, in the county of Union and State of New Jersey, have made certain new and useful Improvements in Conduit or Cable Clamps and Bridle-Rings, of which the following is a specification, taken in connection with the accompanying drawings.

My invention relates to a conduit or cable clamp and more particularly to one formed from wire. It further relates to the combination of such a wire conduit or cable clamp and a saddle provided with means to support a bridle ring. My invention further relates to a saddle provided with means to support either a closed ring bridle ring, or an open ring bridle ring.

My invention further relates to certain combinations, details of construction and articles of manufacture, as will be more fully hereinafter described and pointed out in the claims.

In the figures, in which I have shown one embodiment of my invention, the same reference numerals refer to similar parts in the several figures.

Figure 1 is a perspective view of my wire bridle ring and saddle shown supporting a cable;

Fig. 2 is a perspective view, similar to Fig. 1, with the addition of a sheet metal bridle ring having its two ends supported by the saddle;

Fig. 3 is a vertical section of Fig. 2;

Fig. 4 is a perspective view of a wire conduit or cable clamp, which I preferably employ;

Fig. 5 is a perspective view of the sheet metal bridle ring which I preferably employ;

Fig. 6 is a horizontal section on the line 6—6 of Fig. 1;

Fig. 7 is a perspective view of a modified form of sheet metal bridle ring which may be used with my invention.

Fig. 8 is a perspective view of a wire bridle ring which I may employ.

Prior to my invention it has been customary to support the heavy lead covered conduits or cables 1 by means of cable clamps formed from heavy castings of iron or similar metal, and also by cable clamps formed from pressed sheet steel. By my invention I form a much cheaper conduit or cable clamp which will do the heavy duty required to support the heavy lead covered cables and which will not bend or break under the heavy normal strains, nor will it fail under abnormal strains due to sleet, wind and ice.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form a wire conduit or cable clamp 2 by bending a strand of wire back upon itself to form the hooks 3, 3, the connecting member 4, and the parallel free arms 5, 5. These arms 5, 5 form the base of the conduit or cable clamp and bear against the wall or other suitable support 6 to which they are clamped and securely held by a saddle 7 and securing screw 8. This saddle is preferably provided with the curved portions 9, 9 to take over the arms 5, 5 and prevent lateral displacement of said arms when the screw 8 is screwed home.

The saddle 7 is provided with two horizontal flanges 10, 10. Each flange is provided with a slot 11 to coöperate with a bridle ring.

When the heavy lead covered cable 1 is first installed ordinarily a bridle ring will not be employed. It is only when the capacity of the cable 1 becomes inadequate that additional runs of bridle wires 12, 12 are added to the installation, so as to overcome the deficiency.

In my invention, whenever the emergency arises, these runs of bridle wires can be quickly and economically added to the installation by stringing them through bridle rings supported by the saddle 7.

In my preferred construction I employ a bridle ring 13 formed from stamped sheet metal having the hooks 14 and 15. To attach the bridle ring it is merely necessary to hook the hook 15, through the slot 11 in the lower flange 10 and then compress the bridle ring, which will force the other hook 14 beneath the upper flange 10; then by simple manipulation the hook 14 can be brought in line with the upper slot 11, when it will immediately spring into it. This will securely hold the sheet metal bridle ring 13 to the saddle.

Should the traffic requirements at some later date again render the cable 1 sufficient to carry the traffic load, the runs of bridle wires 12, 12 and the bridle ring 13 can be readily removed by simply compressing the bridle ring so as to withdraw the hook 14 from the upper flange 10, which will then permit the lower hook 15 being lifted out of the slot 11 from the lower flange 10. The bridle rings and bridle wires can then be installed in another location, if desired.

In some cases instead of using a bridle ring such as 13, I may use an open bridle ring 16, Fig. 7, formed from sheet metal having a shank 17 and horizontal arm 18 which is bent down and back toward the shank to form the open ring 19. The shank 17 of this bridle ring can be threaded through the two alined slots 11, 11 in the flanges 10, 10. When the saddle 7 is placed close to the hooks 3, 3 as shown in Figs. 1 and 2, the shank 17 can be threaded through these flanges 10, 10 before the cable is mounted.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a wire conduit or cable clamp, and a saddle provided with means to support a sheet metal bridle ring.

2. The combination of a wire conduit or cable clamp and a saddle provided with two flanges adapted to support a bridle ring in a vertical plane.

3. The combination of a wire conduit or cable clamp formed from a single strand of wire, and a saddle provided with two horizontal flanges each of the flanges being provided with means to receive and hold one end of a bridle ring.

4. The combination of a wire conduit or cable clamp formed from a single strand of wire bent to form a double hook portion, and a double base, the two hooks being connected by an integral portion of the wire, and a saddle provided with means to coöperate with a securing screw, and also provided with means to engage and detachably support a bridle ring.

5. The combination of a wire conduit or cable clamp formed from a single strand of wire bent to form a double hook portion and a double base, the two hooks being connected by an integral portion of the wire, and a saddle provided with means to coöperate with a securing screw, and also provided with means to engage and detachably support the two ends of a bridle ring.

6. The combination of a wire conduit or cable clamp having substantially parallel free arms to lie against a wall, or other suitable support, and securing means to secure said substantially free parallel arms to a wall or other suitable support, said securing means being provided with means to support a bridle ring.

7. A new article of manufacture comprising a saddle adapted to clamp the separated arms of a wire conduit or cable clamp, said saddle having portions to receive the two arms of the wire clamp, and provided between said portions with two flanges having alined slots to coöperate with a bridle ring.

8. The combination of a wire conduit or cable clamp formed by bending a strand of wire back on itself to form two wire hooks and a wire base formed of two free arms, a saddle coöperating with the free arms and provided with means to support a bridle ring.

9. The combination of a wire conduit or cable clamp and a saddle provided with one or more flanges to coöperate with a bridle ring.

10. The combination of a wire conduit or cable clamp and a saddle provided with two flanges having openings to receive the two ends of a bridle ring, and a bridle ring having its ends detachably held in the openings in said flanges.

11. A new article of manufacture comprising a saddle provided with means to bear upon two arms of a wire conduit or cable clamp and having an integral member provided with means to detachably engage a bridle ring.

12. A new article of manufacture comprising a saddle provided with means to bear upon two arms of a wire conduit or cable clamp and having one or more flanges provided with means to detachably engage a bridle ring.

13. The combination of a wire conduit or cable clamp and a saddle, the saddle being provided with means to hold in the same plane both ends of a bridle ring.

HENRY W. PLEISTER.

Witnesses:
MARY R. RYAN,
ELIZABETH J. ROTH.